No. 669,945.
J. G. MOOMY.
BICYCLE.
(Application filed Mar. 7, 1899.)
(No Model.)
Patented Mar. 12, 1901.
2 Sheets—Sheet 2.
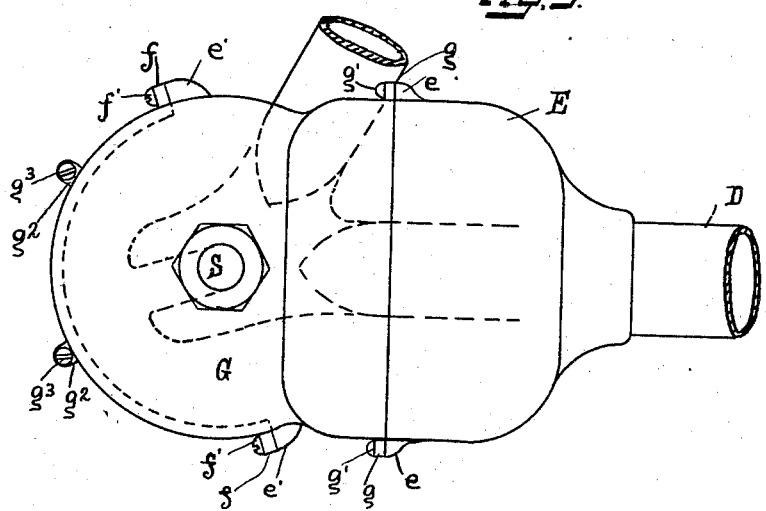
WITNESSES:
INVENTOR
Joseph G. Moomy
BY
ATTORNEY.

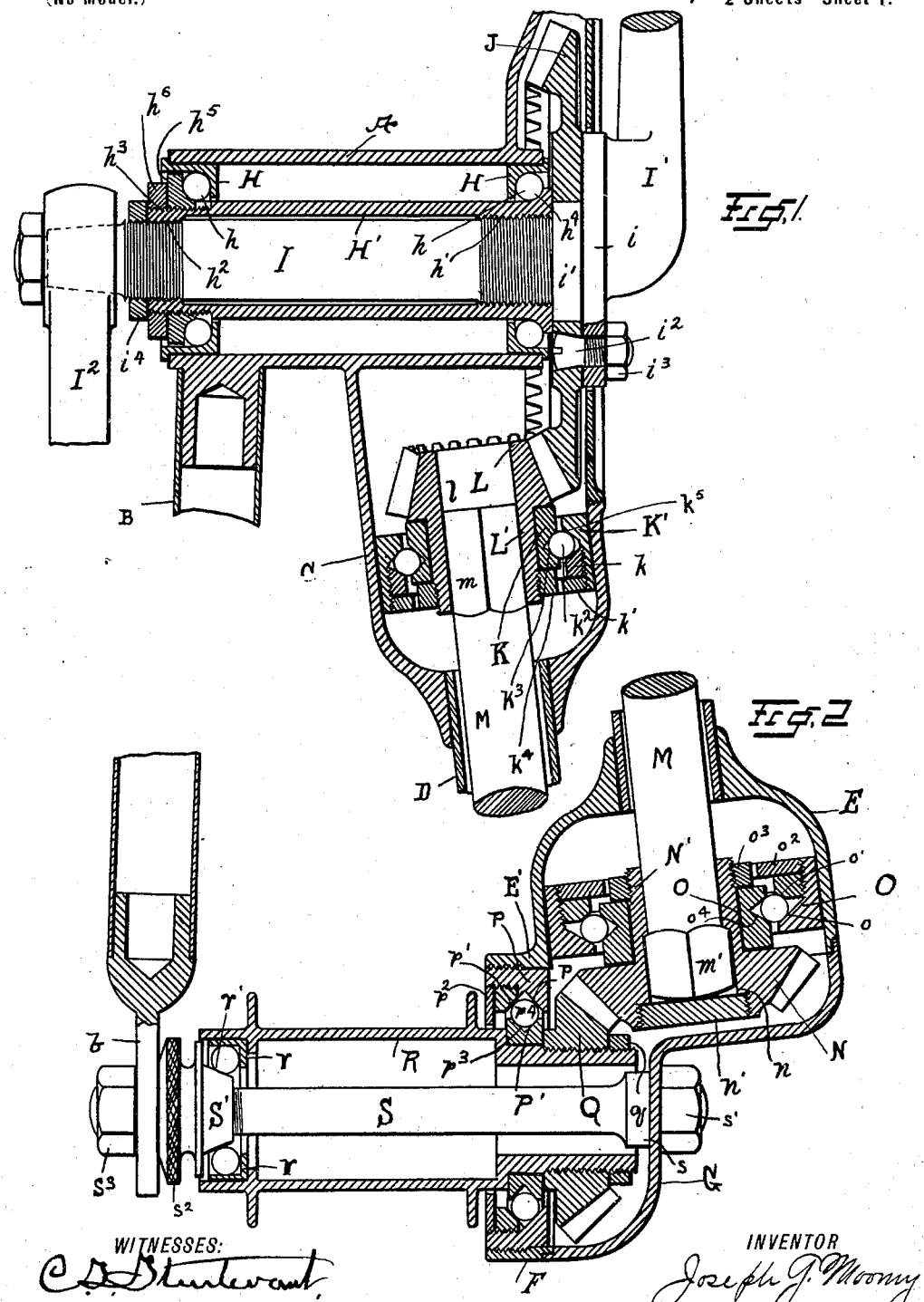

UNITED STATES PATENT OFFICE.

JOSEPH G. MOOMY, OF ERIE, PENNSYLVANIA.

BICYCLE.

SPECIFICATION forming part of Letters Patent No. 669,945, dated March 12, 1901.

Application filed March 7, 1899. Serial No. 708,110. (No model.)

*To all whom it may concern:*

Be it known that I, JOSEPH G. MOOMY, a citizen of the United States, residing at Erie, in the county of Erie and State of Pennsylvania, have invented certain new and useful Improvements in Bicycles; and I do hereby declare the following to be a full, clear, and exact description of the invention, such as will enable others skilled in the art to which it appertains to make and use the same.

This invention relates to bicycles; and it consists in certain improvements in the construction thereof, as will be hereinafter fully described, and pointed out in the claims.

More particularly, the invention relates to "chainless" or geared bicycles.

The objects of the invention are to provide means of adjusting the gears one to another, provide bearings for said gears whereby said adjustment may be accomplished, brackets for carrying said bearings which will maintain the proper adjustment of the gears, and means for transmitting the motion from the crank-gears to the rear gears which will allow a slight deviation or strain on the frame without straining the bearings.

The invention is illustrated in the accompanying drawings, as follows:

Figure 1 shows a horizontal section through the central part of the crank-hanger. Fig. 2 shows a horizontal section through the central part of the rear hub and rear gears. Fig. 3 shows a side elevation of the rear bracket.

A marks the crank-hanger; B, one of the side pieces of the frame; C, the bracket containing the front side gear; D, the side of the frame having the gears; E, the rear bracket; F, a ring or strap secured to the rear bracket by means of which the bearing for the hub-gear is retained, and G a cap for inclosing the rear gears and bearings.

Two cups H are pressed into the ends of the front hanger. A sleeve H' is provided with a cone $h^4$ at the crank end. Balls $h$ are placed between this cone and the cup H and form a bearing at the crank end. The sleeve H' is screw-threaded at $h'$ $h^2$ $h^3$. A cone $h^5$ is screwed on the screw-thread $h^3$, so as to form a bearing with the ball $h$ and cup H. A lock-nut $h^6$ is screwed on the screw-thread $h^3$ and locks the cone $h^5$ in place. The axle I is provided with screw-threads and screwed into the sleeve H' at $h'$ and $h^2$. A lock-nut $i^4$ is provided for locking the axle in the sleeve. The crank $I^2$ may be secured to the axle in any desired manner. The crank I' at the gear end of the axle is supplied with the plates $i$ and a hub $i'$, on which is placed the crank-gear J. The gear is secured to the plate $i$ by means of bolts $i^2$ and nuts $i^3$.

The gear J meshes the side gear L, which has the squared opening $l$ therein, into which extends the squared end $m$ of the shaft M. On the hub L' of the gear L is a collar K, in which is a groove or ball-channel $k^3$. A nut $k^4$ is screwed onto the hub L' and screws the collar K in place. A cup K' is secured in the bracket C and has the ball-bearing surface $k^5$ thereon. A second cup $k$ is screwed into the cup K', forming the fourth point of bearing for the balls $k^2$. A lock-nut $k'$ locks the cup $k$ into place. It will readily be seen that this bearing, which contains but a single line of balls, will maintain the gear L in its proper position without the support of the shaft M, so that the shaft M may be loosely fitted in the opening $l$.

To adjust the gear J to and from the gear L, it is only necessary to loosen the lock-nut $i^4$ and screw the axle in or out, as desired, and then lock it in the adjusted position by the nut $i^4$.

The bracket E has secured in it a cup O, which has a ball-bearing surface $o$ thereon. A second cup $o'$ is screwed into the cup O and also has a ball-bearing surface forming the second point of a fourth point of the bearing. A lock-nut $o^2$ is provided for locking the cup $o'$ in the desired position. The side rear gear N has a hub N', extending into the bearing. On this hub is placed a collar O, in which is a groove or ball-channel $o^4$. A nut $o^3$ is screwed onto the hub and secures the collar O in place. The gear N has a squared opening $n$ of sufficient size in cross-section to allow the introduction of the rod M. The rod M is provided with a squared end $m'$, which fits loosely in the opening $m$. A plug $n'$ is screwed into the end of the gear and secures the rod M in place without forming a rigid connection between the rod M and the gear N.

The bracket E has a rearwardly-extending semicircular portion E'. A cup P is secured in this semicircular portion by means of a strap F. This strap F is provided with ears $f$, which abut lugs $e'$ on the ring portion E' of the bracket. Screws $f'$ are passed through the ears $f$ into the lugs $e'$, secure the strap F in place, and clamp the cup P in the bracket. The cup P is provided with a ball-bearing surface $p$, and a second cup $p'$ is screwed into the cup P. A lock-nut $p^2$ is screwed into the cup P and locks the cup $p'$ in place. The hub-gear Q is screwed onto the extension of the hub R. A collar P', provided with a groove or ball-channel $p^3$, is secured in place on the hub by the gear Q. Balls $p^4$ are arranged between the collar P' and the cups P and $p'$ and form the bearing for the hub-gear. A lock-nut $q$ locks the gear in place on the hub. A cap G is arranged to fit over the gears and bearings and is secured to the bracket E through the medium of the ears $e\ e$ and $g\ g$ and screws $g'\ g'$ and to the ring F through the medium of the ears $g^2$, placed opposite to the similar ears on the ring, and the screws $g^3$. This cap is perforated, and the axle S passes through it and is secured thereto by means of a nut $s'$. A shoulder $s$ on the axle on the inside of the cap allows the nut $s'$ to be set against the cap. The opposite end of the axle S is screw-threaded, and on this screw-thread is screwed the cone S', which is provided with a knurled head $s^2$, by means of which it may be adjusted. The cups $r$ are placed in the hub, and the balls $r'$ form, with the cone S', the usual bearing. The bracket $b$ is formed with the usual slot. (Shown in dotted lines in Fig. 3.) The ends of the axles pass through this slot, and the whole is secured in place by the nut $s^3$.

It will be readily seen that the bearings sustaining the forward and rearward gears are self-sustaining—that is, they will maintain the gears in perfect alinement after the removal of the shaft M and irrespective of the shaft M, so that the shaft M may be loosely connected with them. By this construction if the frame becomes slightly bent the variation is taken care of by the looseness of the shaft without straining the bearings or interfering with the adjustment of the gears. By forming the square end in the rear gear larger than the shaft the shaft may be passed through the rear gear into position and removed in like manner when desired. The bracket E, with the strap F, forms a rigid support for the bearings on which the rear gear and the hub-gear are journaled, so that these gears are by reason of the inclosed formation of the bearings maintained in perfect alinement and adjustment. By removing the cap G and strap F the bearing, with the cup P, is removed with the wheel and when replaced returns to exactly the same position as when taken out. The gear Q may be adjusted to and from the gear N by a screw-thread in the ring E' and strap F, in which the cup P may be turned. The clamping of the strap F, however, clamps the cup P in position. By this construction I form a bearing having a single line of balls which sustain the gears in proper adjustment irrespective of the drive-shafts or other bearings, and thus allow greater elasticity in the frame without interfering with the adjustment of the gears.

What I claim as new is—

1. In a bicycle, the combination with the frame; of a front and rear side gear; bearings for said gears arranged to retain said gears in adjustment independently of a shaft connecting said gears; and a shaft connecting said gears and arranged to transmit the motion of the front gear to the rear gear said shaft being arranged to be passed through the rear gear into position without disturbing the adjustment of said gears.

2. In a bicycle, the combination of the gear, L, having the squared opening, $l$, therein; the shaft, M, having the square ends, $m$ and $m'$; the gear N, having the squared opening $n$, therein of sufficient size to allow the passage of the shaft $n$ through said opening from the rear; and the plug $n'$ for holding the inserted shaft in position.

3. In a bicycle, the combination with the rigid bracket, E; of the strap, F; a sleeve clamped by said strap; the hub-gear; a ball-bearing in said sleeve comprising a single line of balls; and means for adjusting said bearing in said sleeve independently of any other bearing or the presence of the sleeve in the frame.

4. In a bicycle, the combination of the bracket, E, having the semicircular portion, E'; the strap, F, secured to the ring, E'; a bearing part secured by said strap and the cap, G, secured to the bracket, E and the ring, F.

5. In a bicycle, the combination of the bracket, E, having the semicircular portion, E'; the strap, F, secured to the semicircular portion, E'; a bearing part secured by said portion the cap, G, secured to the bracket, E, and strap, F; and the axle, S, having one end secured to the cap, G.

In testimony whereof I affix my signature in presence of two witnesses.

JOSEPH G. MOOMY.

Witnesses:
M. BIERY,
H. C. LORD.